S. TRAGHEIM.
ICE-MACHINE.

No. 189,525. Patented April 10, 1877.

Witnesses.  Inventor.

UNITED STATES PATENT OFFICE.

SIMON TRAGHEIM, OF NEW YORK, N. Y.

IMPROVEMENT IN ICE-MACHINES.

Specification forming part of Letters Patent No. 189,525, dated April 10, 1877; application filed February 1, 1877.

*To all whom it may concern:*

Be it known that I, SIMON TRAGHEIM, of the city, county, and State of New York, have invented a new and useful Improvement in Ice-Freezer, which improvement is fully set forth in the following specification, reference being had to the accompanying drawing, in which—

Figure 1:
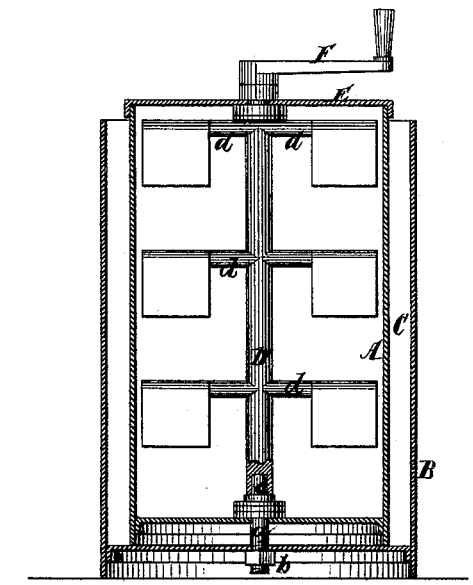
Figure 2:
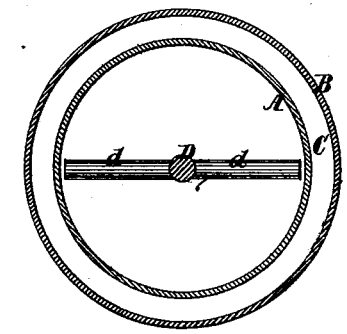

Figure 1 represents a vertical central section of an apparatus such as may be used in carrying out my invention. Fig. 2 is a horizontal section of the same.

Similar letters indicate corresponding parts.

My invention consists in the combination, in an apparatus for manufacturing ice, of an inner and an outer chamber, the inner chamber containing an agitator and the refrigerating or freezing material, and the outer chamber containing the water to be frozen into blocks or cakes, as more fully hereinafter set forth.

In carrying out my invention I construct a vessel, A, of sheet metal, or any other good conductor of heat, by preference in the form of a cylinder.

From the bottom of this vessel extends a screw-stud, a, through the bottom of a tank, B, so that by means of a nut, b, which fits the screw-stud, the vessel A can be secured in the tank B, leaving an annular space, C, for the reception of the water to be congealed. The tank B is, by preference, made in the form of a cylinder of larger diameter than the vessel A, so that when this vessel is secured in the tank the annular space C is of uniform width throughout.

From the bottom of the vessel A rises a pin, c, which fits a socket in the foot of a vertical shaft, D, that rises up through the center of said vessel, and extends through a hole in the cover E, which closes down tight on the vessel A. From the shaft D radiate a series of arms, d, which carry agitating-blades e. On the upper end of said shaft is secured a handle, E, for imparting motion to the agitator.

The vessel A is filled with a freezing mixture—such, for instance, as a saturated solution of chloride of sodium, nitrate of ammonia, and muriate of ammonia—which, when agitated, produces a low degree of temperature, and the annular space C is filled with water. The cover E of the vessel A is closed, and whenever it is desired to congeal or freeze the water in the annular space C the handle F is turned, and as the freezing mixture is agitated the water freezes. After this has been accomplished, the nut b is taken off, and the vessel A is carefully lifted out of the tank B, and by turning this tank upside down the annular piece of ice contained therein is caused to drop out. By these means every housekeeper is enabled to manufacture a sufficient quantity of ice for his or her own private use with little trouble or expense, since the freezing mixture contained in the vessel A can be used for manufacturing a large number of pieces of ice without requiring to be renewed.

My apparatus can also be placed in an ordinary refrigerator, and in this case the tank B is made of metal, and by keeping a piece of ice in it the refrigeration is effected. The piece of ice in the tank B is renewed from time to time by turning the handle F, and by renewing the water in the space C.

What I claim as new, and desire to secure by Letters Patent, is—

The combination, in an apparatus for manufacturing ice, of an inner and an outer chamber, the inner chamber containing an agitator and the refrigerating or freezing material, and the outer chamber containing the water to be frozen into blocks or cakes, substantially as herein shown and described.

In testimony that I claim the foregoing I have hereunto set my hand and seal.

SIMON TRAGHEIM. [L. S.]

Witnesses:
W. HAUFF,
E. F. KASTENHUBER.